(12) United States Patent
Knight

(10) Patent No.: US 6,198,564 B1
(45) Date of Patent: Mar. 6, 2001

(54) OPTICAL SCANNING SYSTEM

(75) Inventor: Geoffrey C. Knight, Claremont, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 05/327,359

(22) Filed: Jan. 29, 1973

(51) Int. Cl.[7] .............................. G02B 26/08; F41G 7/00; H01J 3/14
(52) U.S. Cl. ......................... 359/214; 244/3.16; 250/236
(58) Field of Search ..................................... 356/152, 141; 250/203 R, 236; 244/3.16; 350/6, 7; 359/214

(56) References Cited

U.S. PATENT DOCUMENTS

| | | | |
|---|---|---|---|
| 2,855,521 | * | 10/1958 | Blackstone ........................ 250/203 R |
| 3,054,899 | * | 9/1962 | McKnight et al. ...................... 350/6 |
| 3,330,958 | * | 7/1967 | Kaisler et al. .................... 250/203 R |

* cited by examiner

Primary Examiner—Stephen C. Buczinski
(74) Attorney, Agent, or Firm—David W. Collins; Andrew J. Rudd; Glenn H. Lenzen, Jr.

(57) ABSTRACT

A system using a scanning mirror for scanning the field of view of an optical objective. The scanning mirror is mounted for rotation about an axis transverse to the major plane of the mirror and for pivotal oscillation about an axis lying substantially within the major plane of the mirror. The combined effect of rotation and pivotal movement is to scan the field of view of an optical objective. The scanning angle and other significant characteristics of the scan pattern may be changed as desired by means external to the system, producing, for example, a rosette, spiral, or circular scanned pattern with or without dimensional changes in the total scanned field of view. Such a scanning system may be embodied in seeker systems used for the guidance of radiation-seeking missiles operating in single or multiple regions of the electromagnetic spectrum.

8 Claims, 3 Drawing Sheets

OPTICAL SCANNING SYSTEM

BACKGROUND OF THE INVENTION

In gyro-optical objective systems and other optical telescope applications, it is frequently desirable to scan the field of the optical objective system with a radiation detector, to determine the orientation of a radiation source relative to the optical axis of the objective system. Of the various scanning patterns available, the rosette scan is particularly advantageous in that the relatively small field of view of a radiation detector can be scanned across the entire field of the optical objective to produce a circular search pattern with a relatively large field of view.

There are a number of principal disadvantages to prior art methods of rosette scan generation. Because the pattern is the result of the addition of two concentric co-rotating or counter-rotating vectors, the magnitude of each must be established accurately by fixed mechanical parameters of the separate optical components responsible. For example, a greater or smaller deflection than desired will produce an overlapped or incomplete closure of the center of the scan pattern, effects which are generally unacceptable for optimum operation of the system.

Although minor changes can be made to the cant angle of a mirror, such changes are limited to execution during the assembly process of the optical system and, in the case of a prismatic component, the deviation is a completely fixed function which permits virtually no freedom for such adjustments. Again, the use of a refractive prismatic element for even just one of the deflection components can introduce chromatic and other aberrations which are largely uncorrectable due to the rotational nature of the principal axes of these aberrations.

For similar reasons, the use of refractive elements tends to considerably restrict the wavelength regions over which the objective system may be required to operate, and introduces excessive expense when esoteric materials are used to overcome such restrictions. Additionally, the optical design becomes unduly complex when such systems embody, for mechanical or optical convenience or performance, a combination of both refractive and reflective elements of which two are involved in the process of rosette vector generation. Furthermore, if such a system is required to be gimballed, as in a missile seeker, the use of a non-gimballed prismatic element can additionally degrade the optical resolution of the total system by the introduction of largely uncorrectable comatic effects at substantial look angles.

Yet a further difficulty lies in the necessity to provide mechanical counter-rotating drive systems for the elements concerned, and in the packaging of such systems within practical dimensions. Not only is the power requirement a significant factor, but the complex electromagnetic field structure surrounding, for example, a prism drive motor, can introduce significant noise voltages into the radiation detector and its amplifying circuits which could considerably degrade the total performance of the seeker system. Electrostatic charges, developed by the high rotational speeds of the elements concerned, can also produce similar effects.

A further requirement for correct target signal processing is a reference system for deriving continuous and precise angular information concerning the positions of the vector-producing components. This may involve the use of optical or electromagnetic transducers as pick-off elements to determine the precise position and rotational velocity of an optical element drive shaft, thereby adding to the weight and complexity of the system.

It is therefore desirable to have a scanning optical system that is relatively simple in construction, light in weight, and which produces an inherently accurate scan without inducing undesirable optical aberrations, and which facilitates the reduction of data relative to the orientation of a detected target with respect to the optical axis of the system.

SUMMARY OF THE INVENTION

This invention pertains to means for scanning the field of an optical objective or telescope and, more particularly, to apparatus for determining the direction, spatial origin, or spatial characteristics of a radiation source or radiation distribution pattern relative to the axis of the said objective or telescope system. It will be shown that the method used to secure the specific scanning action by mirror means is inherently simple in nature, and particularly so in comparison with existing methods used to achieve a similar result.

It will also be shown that by using means which do not disturb the basic optical alignment of the system the type of scanning pattern can be quickly changed or modified by external command to perform other specific scanning functions, examples and applications of which will be described hereinafter.

With specific application to a gyro-optical objective system used in the guidance of a radiation-seeking missile, the proposed invention can be made to execute a scanning pattern known as a "rosette". With this type of scan, the comparatively small instantaneous field of view formed by the radiation detector in conjunction with the focal length of the objective, is caused to describe rapid and repetitive sinusoidal excursions forming "leaves", which are displaced angularly at a relatively slower rate to constitute a circular geometrical search pattern having a comparatively large field of view. The rosette pattern is analogous to the path scanned by the radiation detector projected into space in the form of a narrow beam by the objective system. A radiation-emitting target entering the search field stimulates the radiation detector to produce electrical pulse signals whenever the detector's field of view coincides with it. These signals, in turn, provide error information to permit an auxiliary precession system to properly move the gyro-optical axis and, thereby, return the target image to the center of the scanned rosette field.

A particularly significant virtue of the rosette scan lies in the fact that the maximum information sampling or data rate exists at the center of the pattern, which renders the system inherently less sensitive to the effects of spurious targets or confusing spatial radiation pattern distributions.

It is therefore an object of the invention to provide a new and improved optical scanning system.

It is another object of the invention to provide a new and improved optical scanning system which is primarily reflective in nature.

It is another object of the invention to provide a new and improved optical scanning system which has mechanical simplicity.

It is a further object of the invention to produce a new and improved scanning system which is small in size.

It is another object of the invention to produce a new and improved optical scanning system which is light in weight.

It is another object of the invention to provide a new and improved optical scanning system which is more reliable in operation.

It is another object of the invention to provide a new and improved optical scanning system with reduced chromatic and other optical aberrations.

It is another object of the invention to provide a new and improved optical scanning system with a simplified vector reference system.

It is an additional object of the invention to provide a new and improved optical scanning system which permits the selection of a variety of scanning patterns.

It is a further object of the invention to provide a new and improved optical scanning system with a lower signal to noise ratio.

Other objects and many attendant advantages of the invention will become more apparent upon a reading of the following detailed description together with the drawings in which like reference numerals refer to like parts throughout.

DESCRIPTION OF THE PREFERRED EMBODIMENTS

Figure 1:
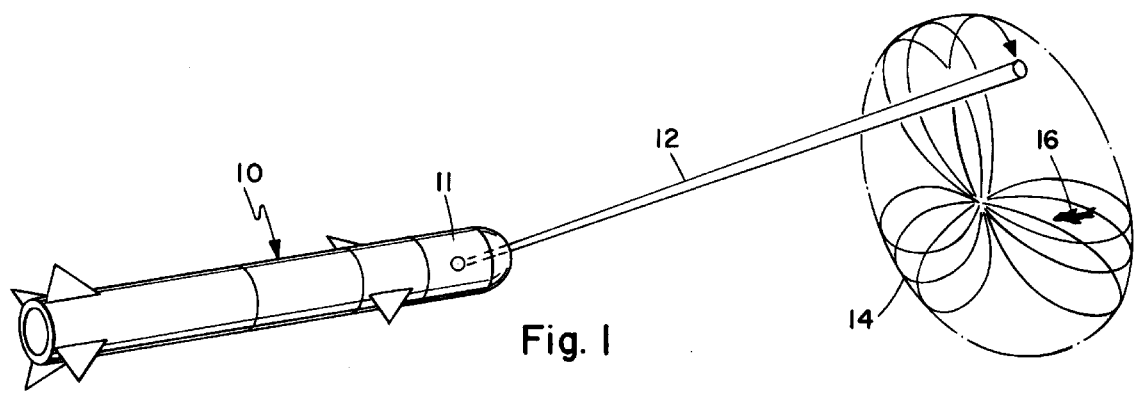
FIG. 1 illustrates a typical vehicle mounting the scanning system and illustrating the rosette scanning pattern.

Referring now to the drawings, there is illustrated in FIG. 1 a vehicle 10 mounting the seeker head portion 11. The projected field of view of the detector or sensor is illustrated by the beam 12 which describes rosette pattern 14 making up, in successive passes, substantially the entire circular field of view of the objective. The field of view is shown to include an intruder aircraft 16 at a position displaced from the center line of the optical axis.

Figure 2:
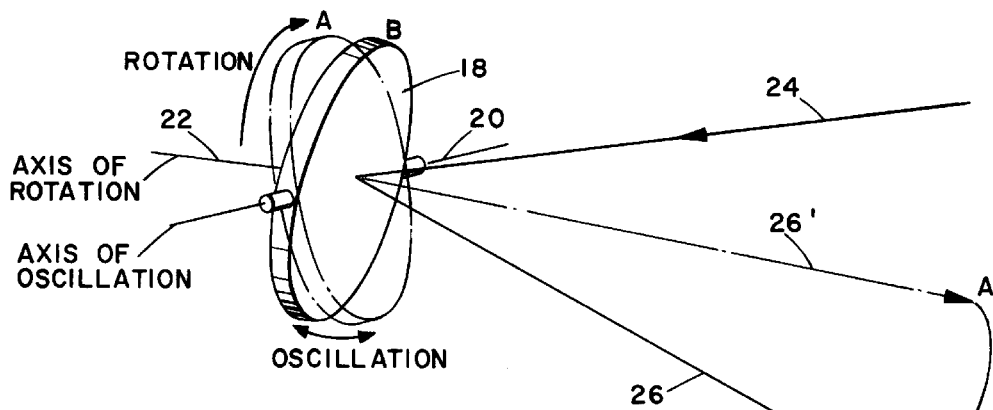
FIG. 2 is a diagram showing the motions of the secondary mirror.

The production of the rosette scan involves the rotation and oscillation of the secondary mirror 18 illustrated in FIG. 2 about two axes simultaneously. The axis of rotation corresponds to the focal axis 22 of the secondary mirror 18 in its central position. The direction of rotation about this axis is indicated by the arrow. The axis of oscillation corresponds to the pivot axis 20 which lies in the plane of the mirror. The pivoting oscillation is illustrated by the double headed arrow. An incident beam of radiant energy 24 will be caused to describe a curved path between the positions A and B on the projected beam 26 and 26'.

Figure 3:
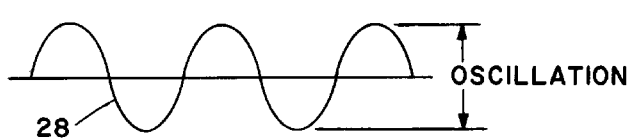
FIG. 3 is a diagram of a typical mirror drive signal for a rosette scan.

The drive signal 28 illustrated in FIG. 3 corresponds to a sinusoidal wave form, and oscillates the mirror 18 at a frequency greater than the rotational frequency of the mirror. For example, a typical oscillation frequency versus rotation frequency would be 25 to 9. The multiple oscillation during each rotation of the mirror 18 produces an overlapping pattern wherein leaves of the rosette pattern are generated and overlapped so that information from all sectors of the field of view of the objective are obtained with minimum delay.

Figure 4:
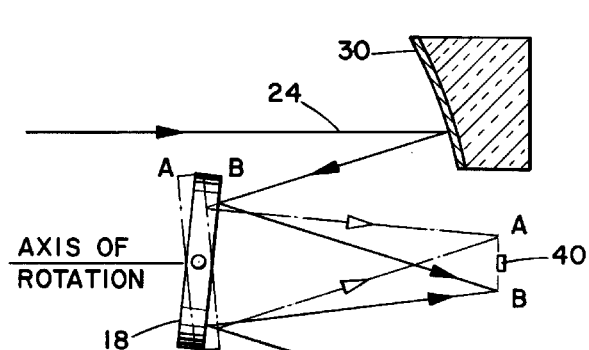
FIG. 4 is a diagram showing the basic optical system.

Referring now to FIG. 4, the cooperative relationship between the primary mirror magnet 30 and secondary mirror 18 is illustrated. Parallel incident rays of radiant energy 24 and 24' from a distant target are illustrated as being reflected from the primary mirror magnet 30 and onto the secondary mirror 18. In the B position of the secondary mirror, the rays are caused to converge at the point B adjacent radiation detector or sensor 40. In the A position of the secondary mirror, the rays are caused to converge at the A position adjacent to the detector 40. Thus the image of the distant target is scanned across the detector 40.

The precise angle through which the secondary mirror pivots provides an analog of the instantaneous position occupied by the scanned field of view. By oscillating the secondary mirror pivotal axis substantially in synchronism with respect to the rotation of the primary mirror 30, an accurate electrical reference signal is generated which is directly referenced to the secondary mirror pivotal axis and, thereby, provides a simplified vector reference from which may be determined the instantaneous position of the target or the intruder aircraft 16 in the total scanned field of view. It must be emphasized that this invention provides the target angular error position relative to seeker optical axis by the unique technique of measurably rotating the secondary mirror pivotal axis while simultaneously oscillating the secondary mirror on the pivotal axis.

As the surface of the secondary mirror 18 passes through its mid-position during the generation of each of the rosette leaves, the instantaneous field of view of the system exactly intersects with the principal, or mean, optical axis of the objective. This action insures complete closure of the rosette at the pattern center and, thereby, preserves the integrity and efficacy of the scanning method. It will be noted that the ability of the invention to preserve this scan pattern integrity is a fundamental property of the oscillating secondary mirror system as described and, furthermore, is completely independent of the frequency or amplitude of the alternating current which is used to induce the mirror's oscillatory motion. Pattern closure is also completely independent of the axial position or rotational frequency of the mirror.

Since pattern closure is thus automatically ensured, it is an intrinsic feature of the invention that other parameters may be deliberately altered to introduce corresponding changes in the nature and capabilities of the scanning pattern. For example, an increased alternating current drive frequency will produce a rosette scan having a greater number of leaves, to provide an increased data rate, if needed. Similarly, an increase or decrease in the amplitude of the alternating current drive will produce a corresponding increase or decrease in the angle of the total scanned field of view. This latter capability can be of considerable importance in a missile seeker where a comparatively large search field is required for initial acquisition of a distant target, but a relatively small field of view is desirable under actual missile flight conditions to permit better rejection of spurious targets and interfering background radiation. It will also be evident to those skilled in the art that such external drive current amplitude changes can be brought about automatically by the use of logic elements which determine the need for field of view changes by analysis of input data. Such data could originate from a transducer such as an accelerometer for example, or from some significant characteristic which is present in the acquisition pulse signals derived as a result of continuously scanning the target and its immediate background during the missile flight.

Figure 5:
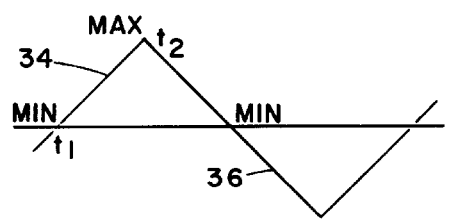
FIG. 5 is a diagram of a mirror drive signal for a spiral scan.
Figure 6:
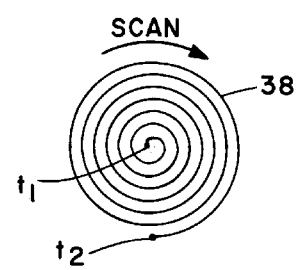
FIG. 6 is a diagram of the spiral scan.

Referring now to FIG. 5, an alternate drive signal for the secondary mirror is shown which illustrates the versatility of the invention in its ability to provide a spiral scan pattern, if desired. An increasing ramp drive signal 34 and decreasing ramp drive signal 36 cooperate to produce the spiral scan 38 illustrated in simplified form in FIG. 6. The frequency of the ramp drive signal is substantially lower than the rotational frequency of the secondary mirror. The spiral scan pattern expands from the T1 to T2 circular size and then contracts, in response to the increasing and decreasing ramp functions, respectively.

Figure 7:
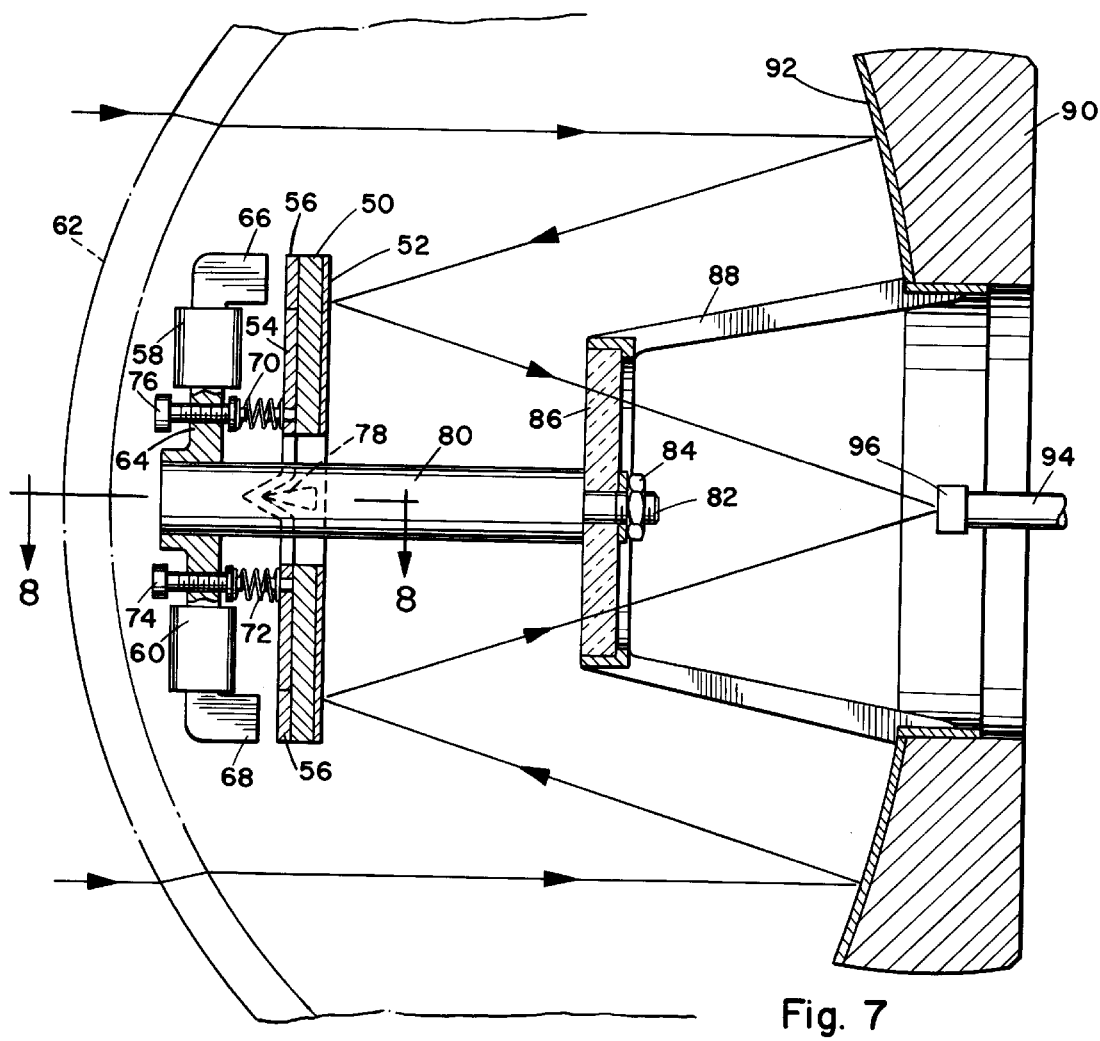
FIG. 7 is an axial sectional view of a complete optical system.

Referring now to FIG. 7, an embodiment of the electromagnetically driven secondary mirror is illustrated. A rotationally mounted primary mirror 90 supports a secondary mirror 50 by way of an optical barrel 88, a transparent support disc 86, and a post 80. Parallel rays are illustrated as passing through a spherical dome element 62 and being reflected from the mirrored surface 92 of primary mirror 90 to the mirrored surface 52 of secondary mirror 50. The rays pass through the transparent support disc 86, which may be of sapphire or similar material, and impinge on the radiation detector or sensor 96 carried on detector support 94. The support disc 86 may be configured to provide sufficient positive power and similar dispersion to that of the dome 62 to compensate for negative chromatic aberration introduced by the dome.

The post 80 is supported on the transparent support disc 86 and secured thereto by a fastener 84 on threaded end 82. Both the mirror 50 and a magnet cradle 64 are carried for rotation on the post 80. Mirror 50 is also supported for pivoting movement about a knife edge bearing 78. The central position of the secondary mirror is adjustable through the use of adjusting screws 74 and 76 bearing on the rear face of the secondary mirror through tension springs 70 and 72. The secondary mirror carries, spaced from the pivotal axis, magnetic inserts 56. These magnetic surfaces are carried adjacent to the pole faces 66 and 68 of electromagnetic coils 58 and 60. The coils 58 and 60 are connected in opposite polarity to the mirror drive through wires and slip ring connections (not shown).

Figures 8, 9, 10:
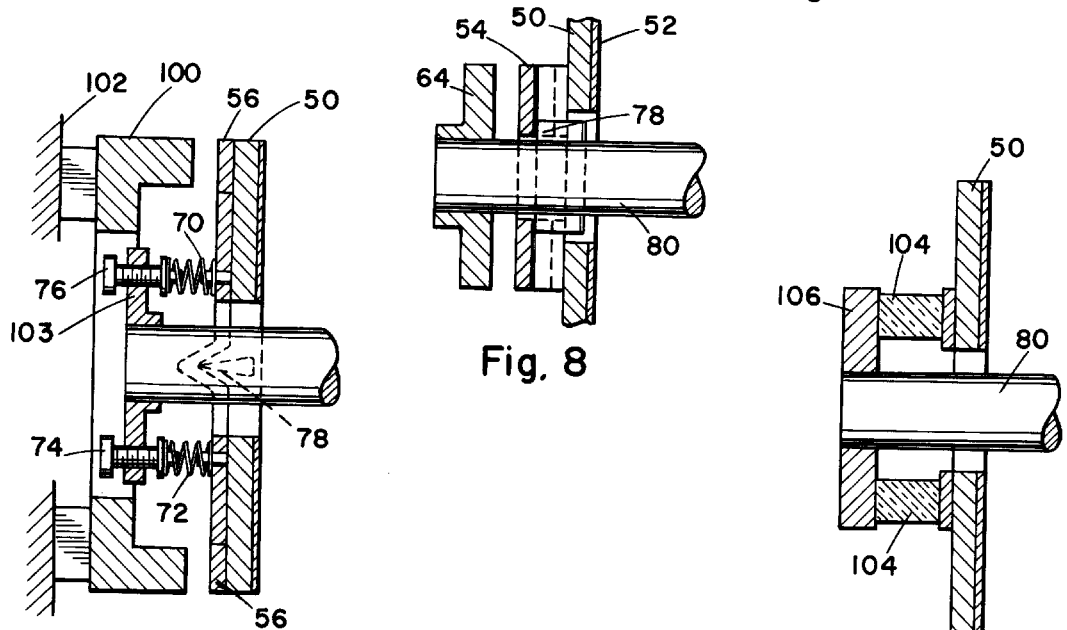
FIG. 8 is a sectional view taken on line 8—8 of FIG. 7.
FIG. 9 is a sectional view similar to a portion of FIG. 7 showing an alternative secondary mirror drive means.
FIG. 10 is a sectional view of an additional type of secondary mirror mounting.

Referring now to FIG. 9, a modification of the basic structure of the invention is illustrated. A permanent magnet assembly 100 is fixedly mounted to a support 102. The magnet structure includes a plurality of alternating magnetic pole pieces spaced around the circumference of the magnetic disc, and positioned to be adjacent to the magnetic surfaces 56 on the secondary mirror 50. A spring support cradle 103 rotates with the secondary mirror 50 on shaft 80 and mounts the tension springs 70 and 72 and adjustment screws 76 and 74 as in the primary embodiment of the invention. As the secondary mirror 50 rotates with respect to the permanent magnet 100, the magnetic inserts 56 are alternately repelled and attracted to the magnetic poles on the magnet 100 thereby producing a pivoting oscillation of the secondary mirror 50 about the pivot knife edge 78. Thus, in this modification, a rosette scan is produced without resort to an electronic drive signal.

A further modification of the invention is illustrated in FIG. 10 and employs a plurality of electrostrictive crystal support posts 104. The mirror structure 50 is carried on the posts 104 and crystal support cradle 106 for rotation on shaft 80. Oppositely polarized signals applied to the electrostrictive posts cause a tilting of the mirror 50 and, by appropriate oscillation of the drive signals the tilting is controlled to produce the rosette scan, spiral scan, or other desired scan much in the manner of the electromagnetically driven secondary mirror.

Figure 11:
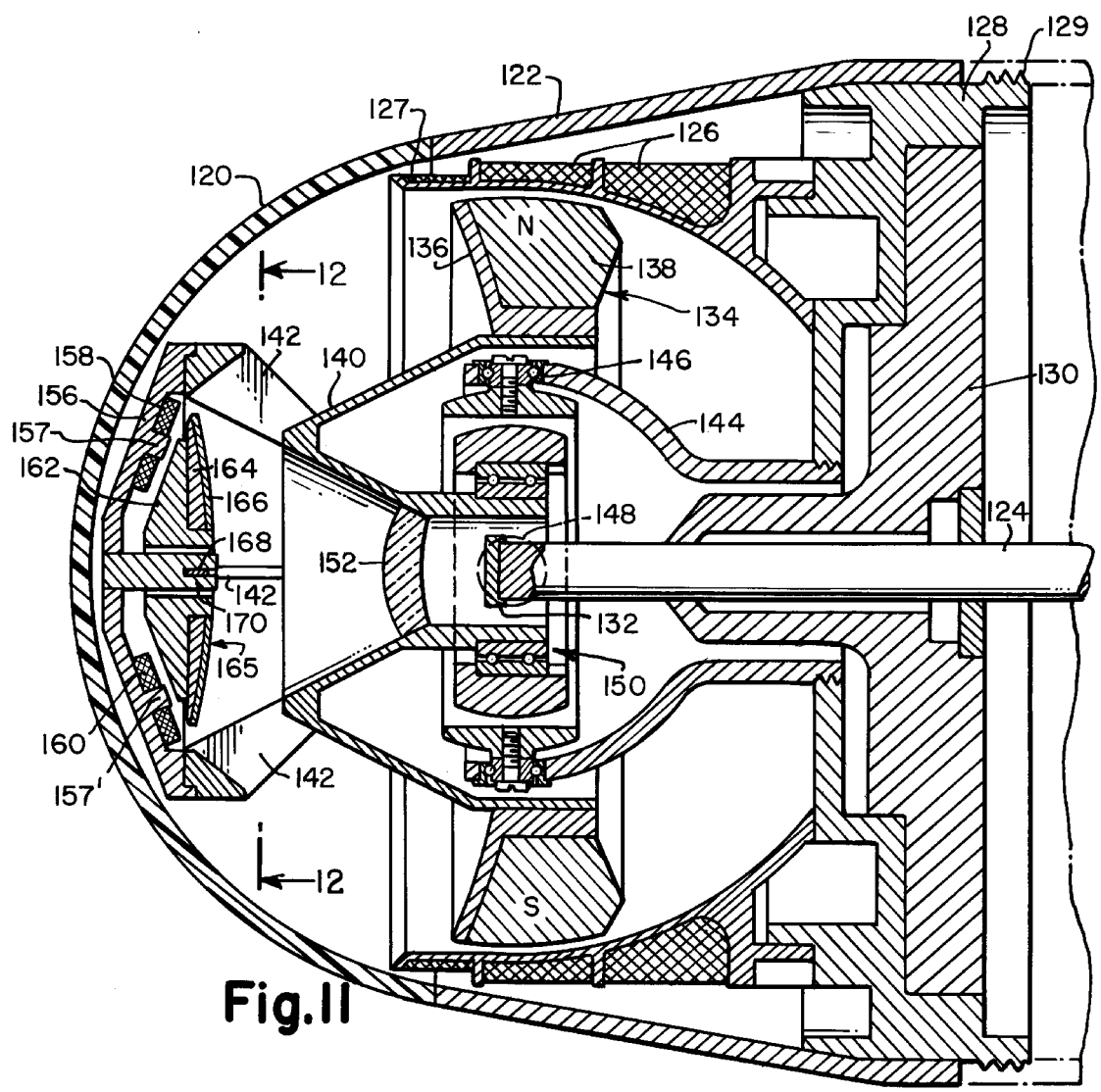
FIG. 11 is an axial sectional view of a typical seeker head incorporating the optical system of the invention.
Figure 12:
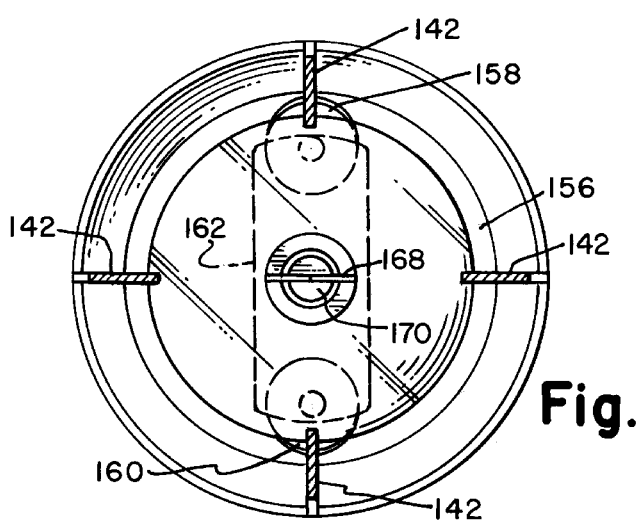
FIG. 12 is a sectional view taken on line 12—12 of FIG. 11.

Referring now to FIGS. 11 and 12, the application of the principles of the primary embodiment of the invention to a missile seeker head is illustrated. A missile seeker head dome 120 and case 122 contain all of the structure associated with the seeker head optics. The seeker head illustrated is of the gyro-optical type wherein the entire primary mirror-magnet system functions as a gyroscope, and is rotated by a rotating electromagnetic field generated externally by drive coils (not shown). A reflective surface 136 of primary mirror-magnet system 134 is affixed to a permanent magnet substrate 138. The primary mirror magnet system 134 rotates about a gimbal bearing 150 mounted within a gimbal housing 144 which is supported by a mounting bulkhead 128. The seeker head is secured to the missile body by a threaded portion 129 of the mounting bulkhead 128. The mounting bulk-head 128 also supports a journal 130 which carries a support post 124 for a detector 132. The primary mirror reflective surface 136 and the reflective surface 166 of a secondary mirror 165 may be configured to compensate for the negative spherical aberration produced by the dome 120. A lens 152 may be configured to provide sufficient positive power and similar dispersion to that of the dome 120 to compensate for negative chromatic aberration introduced by the dome. The secondary mirror 165 is carried for rotation with the primary mirror-magnet system 134 on a plurality of thin support arms 142 as an alternative to the support disc 86 and the post 80 used for this purpose in FIG. 7. The support arms 142 carry the secondary mirror 165 by means of an electromagnetic support cradle 156 and a post 170. Electromagnet coils 158 and 160 are wound upon corresponding electromagnet pole pieces 157 and 157'. The mirror cradle 162 is pivotedly carried on the post 170 by a spring support hinge 168. The hinge 168 is resilient for flexing movement in one axis but resists deformation in other axes. Thus the secondary mirror 165 including substrate 164 and reflective surface 166 is rotated about the gyro axis, and pivoted on an axis which is transverse thereto.

The mirror cradle 162 is formed of magnetic material so that the electromagnet coils 158 and 160 can cause the mirror cradle 162 to be alternately attracted and repelled by the pole pieces 157 and 157', thereby pivoting the mirrored surface 166 to produce the desired scanning action. The entire primary and secondary mirror system is gimballed by gimbal bearings 146 and 148 so that the gyro may be precessed to create a look angle, whereby the optical axes of the system may thus be altered.

When a target is within the total field of the rosette but not coincident with the center of the rosette pattern, pulse signals generated by the radiation detector provide error information to external processing circuitry (not shown). From this circuitry, a correctly phased precession signal is derived which is applied to precession coils 126, which in turn generate the required magnetic flux to move the primary mirror-magnet system 134 in the proper direction to return the target image to the center of the scanned rosette field. By these means the seeker system can maintain lock on a target and continually track target angular deviations with respect to the seeker optical axis. As the primary mirror-magnet system 134 rotates, a corresponding alternating voltage is electromagnetically induced in a cage coil winding 127, whenever the gyro optical axis does not coincide with the mean seeker mechanical axis. This voltage may be applied to the external precession circuitry and a corresponding correctly phased precession signal generated for application to precession coils 126. This will automatically cause the system 134 to return and continuously maintain axial coincidence with the mean seeker mechanical axis, —an operation described as "caging".

The total angular traverse of the secondary mirror oscillatory or rocking motion determines the extent of the scanned field. Since the reflected ray will move through twice the angle executed by the mirror itself, a total search field of 2 degrees, for example, requires a mirror angular traverse of only 1 degree. In the interests of efficiency, the entire secondary mirror assembly can be made to oscillate over a range of frequencies where mechanical resonance of the total mass is either partly or wholly achieved. The exact cant angle occupied by the plane of the secondary mirror with respect to the mean optical axis is a constant function of the relative phase and amplitude of the alternating drive current which is responsible for the mirror's oscillatory motion. Since the phase and amplitude of this drive current are parameters of the electrical supply to the drive coils, it will be evident to those skilled in the art that the instantaneous cant angle of the mirror can be determined with great accuracy by using what is essentially an inherent electro/mechanical inter-relationship to provide an angular reference signal essential for correct signal processing. The remaining vector reference required is that pertaining to the angular position of the secondary mirror pivotal or rocking axis which, in turn, will be used to provide a polar reference for signal processing. This is obtainable by conventional means, using reference coils (not shown) around the gyro system to sense the position of the permanently magnetized primary mirror-magnet system as it revolves with the secondary mirror system.

The flexibility of the invention can be further understood by describing use of the FIG. 11 seeker head embodiment in a guided missile carried by an aircraft, for example. In operation, the mirror system of the invention would be spun up in readiness for launch. Prior to launch, it may be desirable to use a spiral scanning mode so that the information from the radiation detector 132 may be utilized to create a video display of the scanned field of view of the optical system. For this purpose, the coils 158 and 160 would be energized by a ramp drive signal such as that shown in FIG. 5 to generate the expanding and collapsing spiral scan illustrated schematically in FIG. 6. As the radiation detector's relatively small field of view is swept spirally across the comparatively large total field of view of the objective, the detector output signals will contain video information concerning the shape or other spatial characteristics of the target or other scene being scanned, in a manner similar to that of a television camera. It will be apparent to those skilled in the art, that this video information can be electronically processed and presented as a visual display in the aircraft, using a cathode ray tube whose scanning beam is intensity-modulated by the video signals and deflected across the fluorescent screen in a spiral pattern identical to that scanned by the radiation detector. The angular and polar reference signals would be used to trigger the generation of correctly shaped deflection signals to provide a spiral pattern on the cathode ray tube screen which is accurately synchronized in both phase and frequency with that of the seeker's scanning pattern. Such a spiral scan and video display would provide an effective missile bore-sighting or aiming system to accurately aim the guided missile. In this example, the attitude of the aircraft would be first adjusted to bring the desired target into the field of view of the spirally scanning seeker by observation of the cathode ray tube display image.

To assist in this initial acquisition of the target the scanned field of view of the seeker may be increased or decreased as required by manually increasing or decreasing the amplitude of the ramp drive signal applied to the secondary mirror drive system. This action will effectively change the optical magnification of the scanning system to suit the size and range of the particular target involved in the engagement.

The subsequent action of launching the missile could simultaneously initiate a commanded change in the seeker scanning pattern from the spiral "television" mode to the rosette seeker mode to permit the launched weapon to execute its normal engagement with, and eventual interception of, the distant target. For initial tracking, the peak scan voltage can be maximized so as to cause the rosette pattern to scan the entire field of view of the optical objective. As is the usual practice in such systems where a target is detected as being displaced from the central axis of the missile as is illustrated in FIG. 1, the seeker head would be caused to precess to align the optical axis and center the target on the optical axis. Therefore, there would be a look angle or disparity between the optical axis and missile axis, and the flight control of the missile would introduce proportional navigational adjustments to the missile flight path to bring the optical axis and missile axis into final alignment with the target. The rosette pattern is preferred for such application in that the maximum data rate is obtained with the target at the central point and the system of the invention for generating the scan is ideal in that the closure of the rosette pattern at the central optical axis is insured by the inherent operating characteristics of the system. That is, assuming correct prealignment of the secondary mirror, the mechanical bearings on which the mirror rides insure that during each oscillation the mirror will pass through the optical central axis.

As the tracking of the target continues and the range closes, it is possible to automatically decrease the rosette scan amplitude, thereby reducing both the field of view and also the likelihood of false targets, such as flare decoys, being tracked.

It will be noted that the electronic drive system lends itself to the development of a vector position reference system, in that the vector displacement of a detected target can be described as a function of the rotational and pivotal positions of the secondary mirror. These positions, in turn, can be derived from the primary mirror rotational drive source and the secondary mirror scanning drive source, respectively.

As a further alternative to the rosette and spiral scanning patterns described, a simple circular scan (not shown) can be obtained by applying a steady value of direct current to the secondary mirror drive coils. Under this condition, rotation of the gyro-optical system will cause the detector field of view to describe a circular or conical scan of constant diameter on, or immediately surrounding, the distant target. Using a four-detector system instead of the single radiation detector described herein above, the circular scan will cause the target energy to be sequentially presented to each of the four detectors. This action provides the necessary polar information from which seeker precession signals could be developed for target tracking and missile guidance. This system is particularly suitable for tracking targets which are to be simultaneously illuminated by pulse or continuous laser electromagnetic radiation or other optically directed energy sources.

I claim:

1. A scanning mirror apparatus for use in a scanning optical system comprising:

mirror means for reflecting incident rays of radiant energy, rotation means for rotating said mirror means about an axis normal to the major plane of said mirror means, oscillation drive means for pivoting said mirror means back and forth on a pivot bearing on an axis lying in said major plane, means for biasing said mirror means to a predetermined central planar orientation, said oscillation drive means forcing said mirror means to pivot against said bias, said mirror means including a magnetic material spaced from said pivot axis, and said oscillation drive means comprising electromagnetic means mounted for rotation with said mirror means and fixed against pivoting for attracting said magnetic material of said mirror means and pivoting said mirror means on both sides of the said central planar orientation.

2. The scanning mirror apparatus of claim 1 wherein:

said means for biasing said mirror means comprises tension spring means.

3. The system of claim 1 wherein:

said pivot bearing comprises a spring element having a flexure axis corresponding to said pivot axis.

4. A system for scanning the field of an optical objective comprising:

a radiation detector for detecting rays of radiant energy, primary mirror means for reflecting and converging said rays of radiant energy from the entire field of view of said optical objective secondary mirror means for receiving said rays of radiant energy from said primary mirror means, said secondary mirror means mounted for rotation about an axis normal to the major plane of said secondary mirror means, and said secondary mirror means additionally mounted on a pivot bearing for pivoting said secondary mirror means back and forth on an axis lying in said major plane, said secondary mirror means for scanning substantially all of said field of view across the relatively smaller field of view of said radiation detector, said secondary mirror means being driven to pivot about said pivot axis by electromagnet means mounted adjacent to and in axial alignment with said secondary mirror means, said electromagnet means rotating with said secondary mirror means, said secondary mirror means including cooperating magnetic materials spaced from said pivot axis, said electromagnet means being driven to pivot said secondary mirror means during rotation of said secondary mirror means, and said electromagnet means is driven by a substantially sinusoidally varying drive current at a frequency greater than the rotation frequency of said secondary mirror during each rotation of said secondary mirror means to produce a rosette scan.

5. The system of claim 4 wherein:

said pivot bearing comprises a spring element having a flexure axis corresponding to said pivot axis.

6. The system of claim 4 wherein:

the amplitude of said drive current is varied to vary the effective field of view of said objective.

7. The system of claim 4 wherein:

said secondary mirror means is supported from said primary mirror means, said secondary mirror means comprising a toroidal portion of substantially spherical surface mounted for gimballed rotation about said detector.

8. A system for scanning the field of an optical objective comprising:

a radiation detector for detecting rays of radiant energy, primary mirror means for reflecting and converging said rays of radiant energy from the entire field of view of said optical objective, secondary mirror means for receiving said rays of radiant energy from said primary mirror means, said secondary mirror means mounted for rotation about an axis normal to the major plane of said secondary mirror means, said secondary mirror means additionally mounted on a pivot bearing for pivoting said secondary mirror means back and forth on an axis lying in said major plane, said secondary mirror means for scanning substantially all of said field of view across the relatively smaller field of view of said radiation detector, said secondary mirror means being driven to pivot about said pivot axis by permanent magnet means mounted adjacent to and in axial alignment with said secondary mirror means, said secondary mirror means including cooperating magnetic material spaced from said pivot axis, said permanent magnet means alternately attracting and repelling said magnetic material during rotation of said secondary mirror means to produce oscillating tilting of said secondary mirror means.

* * * * *